US010155496B2

United States Patent
Faruque et al.

(10) Patent No.: US 10,155,496 B2
(45) Date of Patent: Dec. 18, 2018

(54) AIRBAG WITH SIDE CHAMBERS

(71) Applicant: Ford Global Technologies, LLC, Dearborn, MI (US)

(72) Inventors: Mohammed Omar Faruque, Ann Arbor, MI (US); Saeed David Barbat, Novi, MI (US); Dean M. Jaradi, Macomb, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 58 days.

(21) Appl. No.: 15/373,986

(22) Filed: Dec. 9, 2016

(65) Prior Publication Data

US 2018/0162312 A1 Jun. 14, 2018

(51) Int. Cl.
| | |
|---|---|
| *B60R 21/2338* | (2011.01) |
| *B60R 21/231* | (2011.01) |
| *B60R 21/233* | (2006.01) |
| *B60R 21/239* | (2006.01) |
| *B60R 21/205* | (2011.01) |
| *B60R 21/013* | (2006.01) |
| *B60R 21/00* | (2006.01) |

(52) U.S. Cl.
CPC .......... *B60R 21/233* (2013.01); *B60R 21/231* (2013.01); *B60R 21/239* (2013.01); *B60R 21/2338* (2013.01); *B60R 21/013* (2013.01); *B60R 21/205* (2013.01); *B60R 2021/0004* (2013.01); *B60R 2021/0009* (2013.01); *B60R 2021/0039* (2013.01); *B60R 2021/23382* (2013.01)

(58) Field of Classification Search
CPC . B60R 21/233; B60R 21/239; B60R 21/2338; B60R 21/205; B60R 21/231; B60R 2021/23382; B60R 2021/0004; B60R 2021/0009; B60R 2021/0023; B60R 2021/0039; B60R 2021/0048; B60R 2021/23324; B60R 2021/23308; B60R 2021/23316
USPC .............................................. 280/729, 743.1
See application file for complete search history.

(56) References Cited

U.S. PATENT DOCUMENTS 8,678,429 B2   3/2014 Nagasawa et al.
9,845,067 B2 * 12/2017 Morris .................. B60R 21/233
(Continued)

FOREIGN PATENT DOCUMENTS

JP          332956 A      2/1991
JP         8324373 A     12/1996
(Continued)

OTHER PUBLICATIONS

UK Search Report dated Apr. 18, 2018 re GB Appl. No. 1719968.8.

*Primary Examiner* — Keith J Frisby
(74) *Attorney, Agent, or Firm* — Frank A. MacKenzie; Bejin Bieneman PLC

(57) ABSTRACT

An airbag includes a middle chamber having a front panel and first and second side panels spaced from each other and extending from the front panel. The airbag includes a first side chamber attached to the first side panel and a second side chamber attached to the second side panel, and a manifold chamber spaced from the front panel and attached to and in fluid communication with the middle chamber and the first and second side chambers.

20 Claims, 6 Drawing Sheets

(56) References Cited

U.S. PATENT DOCUMENTS

2004/0256848 A1* 12/2004 Miyata ................. B60R 21/233
                                                        280/743.2
2007/0262570 A1    11/2007 Choi
2015/0307055 A1    10/2015 Cheng et al.
2017/0253212 A1*  9/2017 Choi .................... B60R 21/233

FOREIGN PATENT DOCUMENTS

| JP | 2005247272 A     | 9/2005  |
| JP | 2006256508 A     | 9/2006  |
| JP | 5366591 B2       | 12/2013 |
| KR | 19291291 22644 A | 11/2012 |
| KR | 101552658 B1     | 9/2015  |

* cited by examiner

AIRBAG WITH SIDE CHAMBERS

BACKGROUND

Vehicles may include a variety of airbags that can deploy during vehicle impacts to absorb energy from occupants of the vehicles during the impact. The airbag may be a component of an airbag module including a base supporting the airbag, and an inflator in communication with the airbag for inflating the airbag from an uninflated position to an inflated position.

The vehicle may include an impact sensing system in communication with the airbag module for sensing a vehicle impact and instructing the inflator to inflate the airbag when a vehicle impact is sensed. The impact sensing system may sense the direction of the impact and may selectively inflate, or not inflate, certain airbags of the vehicle or extensions of the airbag based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in a front corner of the vehicle at an oblique angle with a rigid barrier. In this test, a test dummy in a front passenger seat may be urged forwardly and toward the impacted corner of the vehicle.

Another type of impact test is the new NHTSA frontal oblique impact test. In this test, the test dummy in the front passenger seat is urged in a cross-vehicle direction toward a driver side door of the vehicle or toward a passenger side door of the vehicle depending on whether the oblique impact is on a left or a right side of the vehicle.

DETAILED DESCRIPTION

Figure 1:
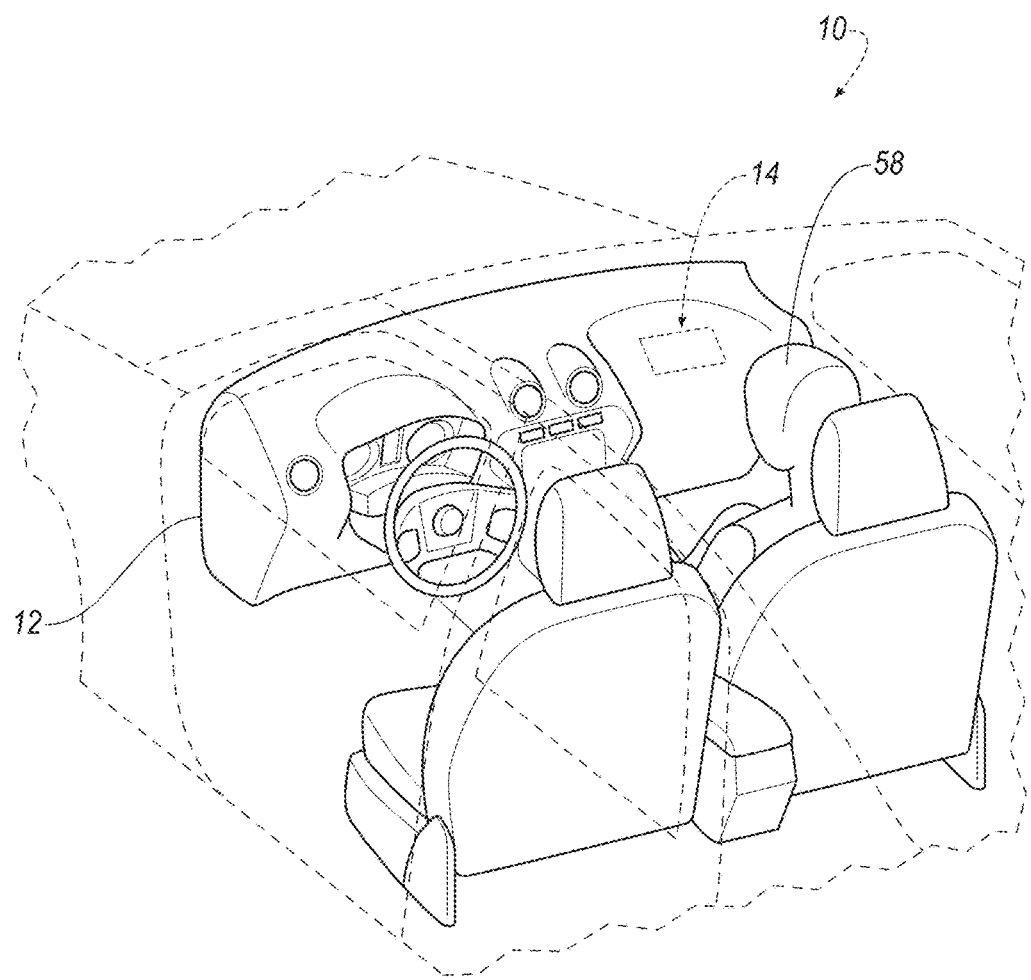
FIG. 1 is a perspective view of a portion of a vehicle including an occupant seated in front of an instrument panel supporting an airbag module.
Figure 2:
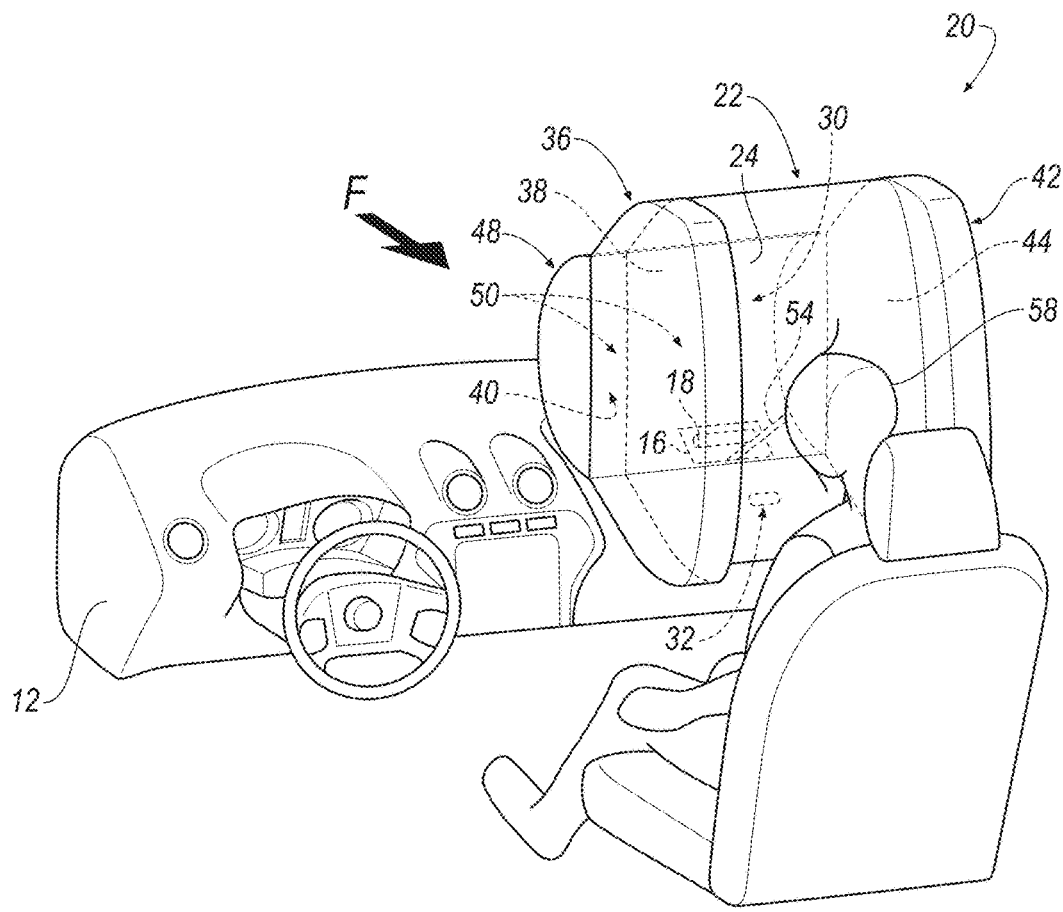
FIG. 2 is a perspective view of the occupant moving forward and impacting an airbag deployed to an inflated position, a tether connecting a base of the airbag module to a front panel of a middle chamber of the airbag, and a vent in the middle chamber.
Figure 3:
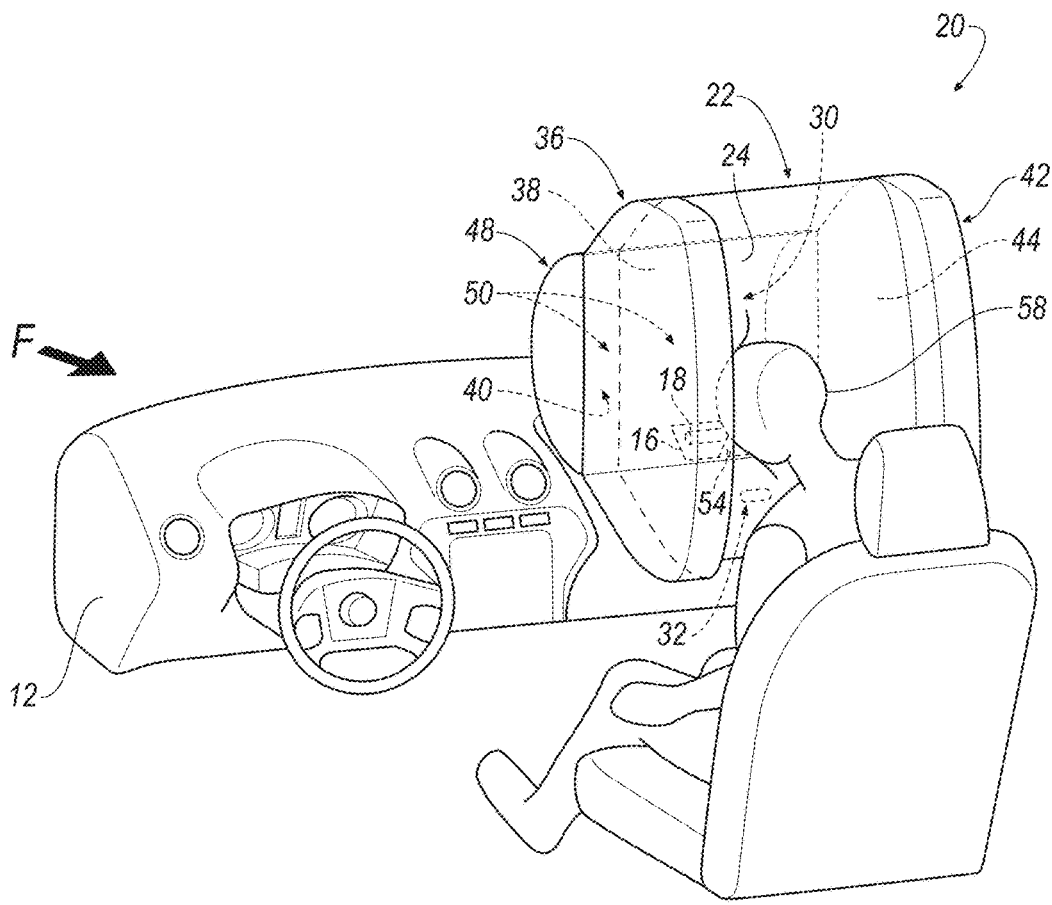
FIG. 3 is a perspective view of the occupant moving forward and to the left and impacting the airbag deployed to the inflated position, the tether connecting the base of the airbag module to the front panel of the middle chamber of the airbag, and the vent in the middle chamber.

With reference to the Figures, wherein like numerals indicate like parts throughout the several views, a vehicle 10 can include an instrument panel 12 as shown in FIGS. 1-3. An airbag module 14 may be supported by the instrument panel 12. The airbag module 14 can include a base 16, an inflator 18, and an airbag 20. The instrument panel 12 can support the base 16. The base 16 can support the inflator 18 and the airbag 20. The inflator 18 is in fluid communication with the airbag 20.

FIGS. 1-3 show the airbag module 14 supported by the instrument panel 12 of the vehicle 10. Alternatively or additionally, the airbag module 14 can be supported in a steering wheel, a vehicle seat, e.g., a back of the vehicle seat, etc.

The airbag 20 includes a middle chamber 22. The middle chamber 22 includes a front panel 24, a first side panel 26, and a second side panel 28. The first side panel 26 is spaced from the second side panel 28. The first and second side panels 26, 28 extend from the front panel 24. A first side chamber 36 is attached to the first side panel 26, and a second side chamber 42 is attached to the second side panel 28. A manifold chamber 48 is spaced from the front panel 24, and attached to and in fluid communication with the first side chamber 36, the middle chamber 22, and the second side chamber 42.

Figure 4:
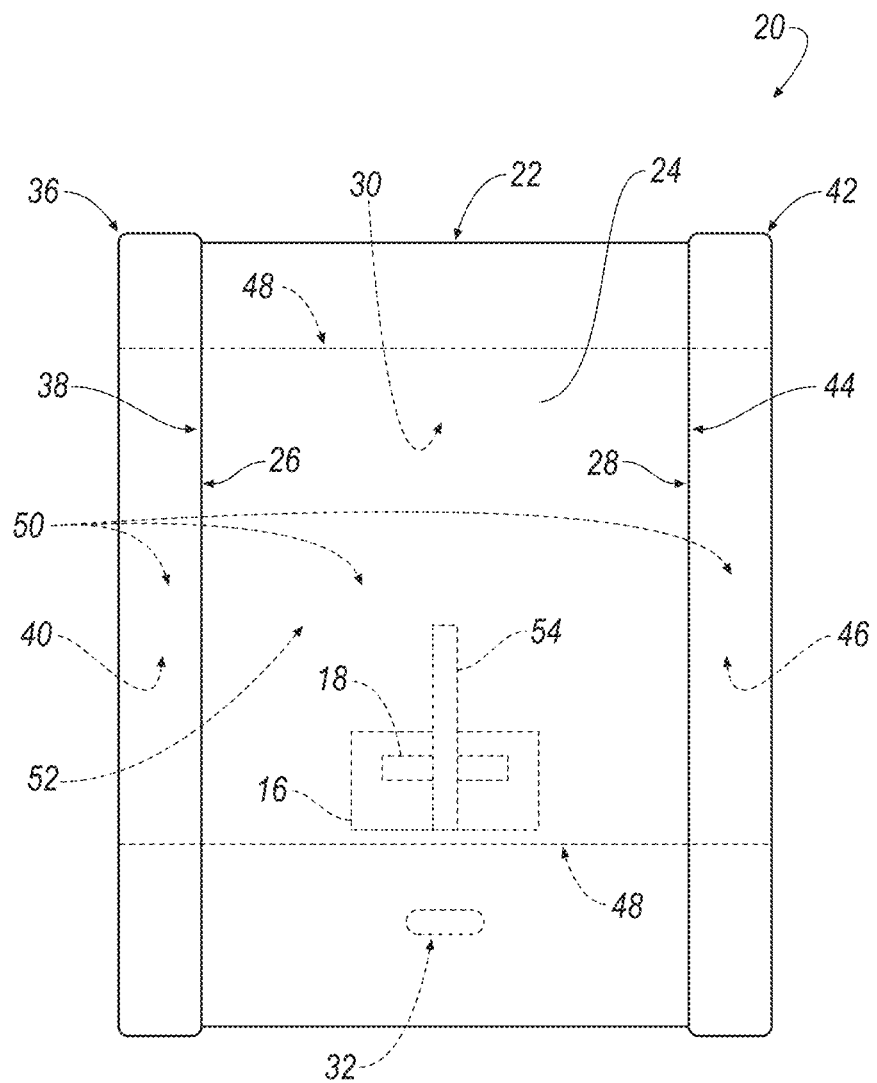
FIG. 4 is a front view of the airbag deployed to the inflated position with the tether connecting the base to the front panel of the middle chamber, and the vent in the front panel of the middle chamber.

The middle chamber 22, the first side chamber 36, the second side chamber 42, and the manifold chamber 48 can define an inflation chamber 52. The inflation chamber 52 may be inflatable to inflate the airbag 20 from an uninflated position as shown in FIG. 1, to an inflated position as shown in FIG. 2-4.

The airbag 20 may deploy to the inflated position in response to, e.g., an impact of the vehicle 10. In the inflated position, the airbag 20 extends from the base 16 and the instrument panel 12. As discussed above, the airbag module 14 may also be supported by the steering wheel, the vehicle seat, etc. In those instances, the airbag 20 would extend from the base 16 and the steering wheel, and/or the base 16 and the vehicle seat, etc.

In the inflated position, the airbag 20 may absorb energy from an occupant 58 during the impact of the vehicle 10 to reduce the likelihood of the occupant 58 impacting other occupants and/or structures in an interior of the of the vehicle 10, e.g., the instrument panel 12.

For example, during an impact of the vehicle 10, the occupant 58 may be urged into the airbag 20, as shown in FIGS. 2 and 3. A head, torso, or other extremities (e.g., arms and legs) of the occupant 58 may contact the airbag 20, which may absorb energy from the occupant 58. In addition, the head of the occupant 58 may contact the front panel 24 of the middle chamber 22 in a space between the first side chamber 36 and the second side chamber 42 of the airbag 20. In this way, the first and second side chambers 36, 42 may retain the head of the occupant 58. This may reduce forward movement of the head of the occupant 58, which may reduce head injury criteria (HIC), as well as reduce rotational movement of the head of the occupant 58, which may reduce brain injury criteria (BrIC).

As discussed above and shown in FIGS. 1-4, the airbag module 14 can include the base 16 that supports the airbag 20. For example, the base 16 may house the airbag 20 when the airbag 20 is in the uninflated position. The base 16 may provide a reaction surface when the airbag 20 is deployed to the inflated position. The airbag 20, e.g., the manifold chamber 48, may be attached to the base 16 with clips, fasteners, adhesives, etc. The base 16 can be of any suitable type, and may be formed from any suitable material, such as plastic, metal, composite, etc. The base 16 may include brackets (not shown) or the like for mounting the airbag module 14 on or in the instrument panel 12, the steering wheel, the vehicle seat, etc.

The airbag module 14 may include the inflator 18 in fluid communication with the airbag 20. The inflator 18 expands the airbag 20 with an inflation medium, such as a gas, to move the airbag 20 from the uninflated position to the inflated position. Specifically, the inflator 18 may be in communication with the inflation chamber 52 of the airbag 20 to supply the inflation medium to the inflation chamber 52.

The inflator 18 may, for example, be a pyrotechnic inflator that uses a chemical reaction to drive the inflation medium into the airbag 20. Alternatively, the inflator 18 may be a cold-gas inflator that, when activated, ignites a pyrotechnic charge that creates an opening for releasing the pressurized inflation medium to the airbag 18. Alternatively, the inflator 18 may be of any suitable type, for example, a hybrid inflator.

As shown in FIGS. 2-4, the inflator 18 may be disposed in the base 16 of the airbag module 14, and in fluid communication with, e.g., the manifold chamber 46 via a fill tube (not shown). Alternatively, the inflator 18 may be disposed in the airbag 20. For example, the inflator 18 may be integrated into the manifold chamber 48 of the airbag 20.

As discussed above and shown in FIGS. 2-5, the airbag 20 includes the middle chamber 22. The middle chamber 22 includes the front panel 24, the first side panel 26, and the second side panel 28. The first side panel 26 is spaced from the second side panel 28. The first and second side panels 26, 28 extend from the front panel 24. The middle chamber 22, including the front panel 24, the first side panel 26 and the second side panel 28, may be one-piece, or the first side panel 26 and the second side panel 28 may be connected to the front panel 24 in any suitable fashion, e.g., stitching, adhesives, chemical welding, staples, and the like.

Figure 5:
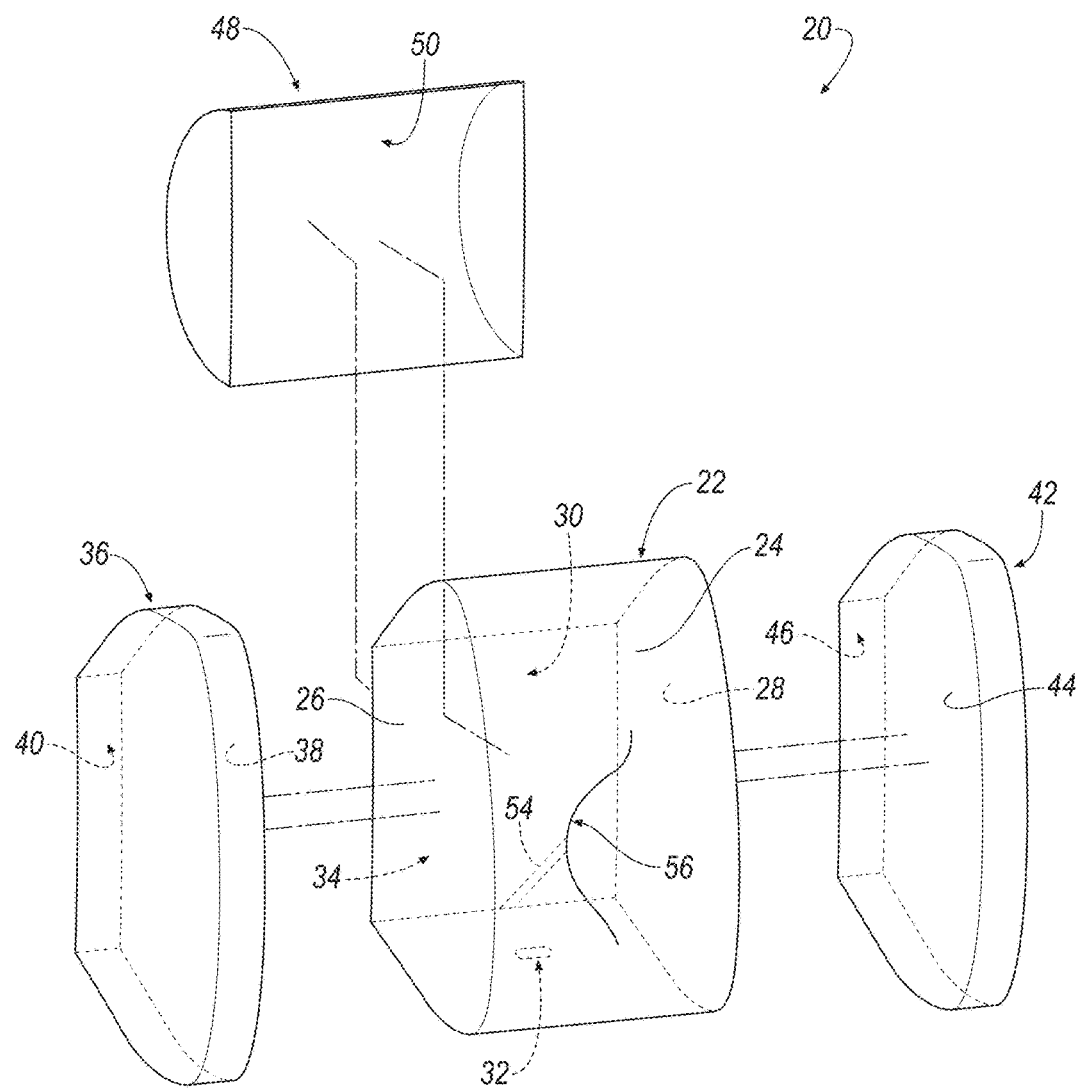
FIG. 5 is an exploded view of the example of the airbag in FIGS. 2-4.

As shown in FIG. 5, the middle chamber 22 can include an open end 30. For example, the first and second side panels 26, 28 of the middle chamber 22 can extend from the front panel 24 to define the open end 30 of the middle chamber 22.

The middle chamber 22 may be configured to have a lower inflated stiffness then the first and second side chambers 36, 42. For example, the middle chamber 22 can include a vent 32 from an interior 34 of the middle chamber 22 to an exterior of the airbag 20. The vent 32 may be of any suitable type, e.g., an open vent, a one-way vent, a two-way vent, or an active vent. The vent 32 can permit the inflation medium introduced by the inflator 18 into the interior 34 of the middle chamber 22 to exhaust more readily to the exterior of the airbag 20 relative to the inflation medium introduced into the first and second side chambers 36, 42.

In addition or in the alternative to the vent 32, the middle chamber 22 may be formed from materials having a higher permeability to the inflation medium than the first and second side chambers 36, 42. For example, the materials used to form the middle chamber 22 may have a lower denier and/or lower thread count than the materials used to form the first and second side chambers 36, 42. Alternatively or additionally, the first and second side chambers 36, 42 may include a coating, e.g., such as silicone, neoprene, urethane, and so on. For example, the coating may be polyorgano siloxane. The middle chamber 22 may be uncoated, or can include a coating having a higher permeability to the inflation medium than the coating on the first and second side chambers 36, 42

As shown in FIGS. 2-5, the airbag 20 also includes the first side chamber 36. The first side chamber 36 is attached to the middle chamber 22 and the manifold chamber 48. For example, an inner panel 38 of the first side chamber 36 may extend along the first side panel 26 of the middle chamber 22. The inner panel 38 of the first side chamber 36 can be attached, e.g., with stitching, adhesives, chemical welding, staples, etc., to the first side panel 26 of the middle chamber 22. For example, a perimeter of the first side panel 26 of the middle chamber 22 may be stitched or otherwise attached to the inner panel 38 of the first side chamber 36.

As shown in FIG. 5, the first side chamber 36 can include an open end 40. For example, the inner panel 38 of the first side chamber 36 may extend to define the open end 40 of the first side chamber 36. In this instance, when the first side chamber 36 is attached to the middle chamber 22 and the manifold chamber 48, the inner panel 38 of the first side chamber 36 may extend along the first side panel 26 of the middle chamber 22 from at least the front panel 24 to the manifold chamber 48. Moreover, as shown in FIGS. 2 and 3, when the airbag 20 is in the inflated position, the first side chamber 36 may extend further from the manifold chamber 48 than the front panel 24 of the middle chamber 22.

Referring to FIGS. 2-5, the airbag 20 also includes the second side chamber 42. The second side chamber 42 is attached to the middle chamber 22. For example, an inner panel 44 of the second side chamber 42 may extend along the second side panel 28 of the middle chamber 22. The inner panel 44 of the second side chamber 42 can be attached, e.g., with stitching, adhesives, chemical welding, staples, etc., to the second side panel 28 of the middle chamber 22. For example, a perimeter of the second side panel 28 of the middle chamber 22 may be stitched or otherwise attached to the inner panel 44 of the second side chamber 42.

As shown in FIG. 5, the second side chamber 42 can include an open end 46. For example, the inner panel 44 of the second side chamber 42 may extend to define the open end 46 of the second side chamber 42. In this instance, when the second side chamber 42 is attached to the middle chamber 22 and the manifold chamber 48, the inner panel 44 of the second side chamber 42 may extend along the second side panel 28 of the middle chamber 22 from at least the front panel 24 to the manifold chamber 48. Moreover, as shown in FIGS. 2 and 3, when the airbag 20 is in the inflated position, the second side chamber 42 may extend further from the manifold chamber 48 than the front panel 24 of the middle chamber 22.

Referring to FIGS. 2-5, the airbag 20 also includes the manifold chamber 48. The manifold chamber 48 is spaced from the front panel 24 of the middle chamber 22. As discussed above, the manifold chamber 48 is attached to and in fluid communication with the middle chamber 22, and the first and second side chambers 36, 42.

For example, the manifold chamber 48 can include an open end 50 as shown in FIG. 5. The open ends 30, 40, 46 of the middle chamber 22, the first side chamber 36, and the second side chamber 42, respectively, can each be attached to the open end 50 of the manifold chamber 48. In this way, the middle chamber 22, the first side chamber 36, and the second side chamber 42 are each in fluid communication with the open end 50 of the manifold chamber 48.

The manifold chamber 48 can be attached to the middle chamber 22, the first side chamber 36, and the second side chamber 42 in any suitable way. For example, the first and second side chambers 36, 42 may be attached to the middle chamber 22, as discussed above. Following that, a perimeter of the open end 50 of the manifold chamber 48 can be attached to the first side chamber 36, the middle chamber 22 and the second side chamber 42 in a suitable fashion, e.g., stitching, adhesives, chemical welding, staples, and the like.

As discussed above, the inflator 18 may be in fluid communication with, e.g., the manifold chamber 48 of the airbag 20. For example, as shown in FIGS. 2-4, the inflator 18 may be disposed in the base 16 of the airbag module 14, external to the airbag 20. In this instance, the inflator 18 may be in fluid communication with the manifold chamber 48 via a fill tube (not shown).

Alternatively, the inflator 18 may be integrated into the manifold chamber 48 of the airbag 20. In this instance, the inflator 18 may be disposed in the manifold chamber 48. The inflator 18 can include fasteners (not shown), e.g., threaded bolts, which pass through openings (not shown) in the manifold chamber 48 to affix the airbag 20 and the inflator 18 to brackets (not shown) in the base 16 of the airbag module 14.

The airbag 20 can also include a tether 54. The tether 54 may be connected to the front panel 24 of the middle chamber 22 and, e.g., the base 16 of the airbag module 14. As shown in FIG. 5, when the airbag 20 is deployed to the inflated position, the tether 54 may be configured to form a depression 56 in the front panel 24. The depression 56 may assist in retaining the head of the occupant 58 during an impact event. This may reduce forward movement of the head of the occupant 58, which may reduce HIC, and reduce rotational movement of the head of the occupant 58, which may reduce BrIC.

The airbag 20 may be formed of any suitable airbag material, for example, a woven polymer. For example, the airbag 20 may be formed of woven nylon yarn, for example, nylon 6,6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

As discussed above, the middle chamber 22 of the airbag 20 may be formed from a material having a lower denier and/or lower thread count than the material used to form the first and second side chambers 36, 42. Moreover, the first and second side chambers 36, 42 of the airbag 20 may be coated, while the middle chamber 22 is not. In either case, the middle chamber 22 may have a lower inflated stiffness then the first and second side chambers 36, 42.

Figure 6:
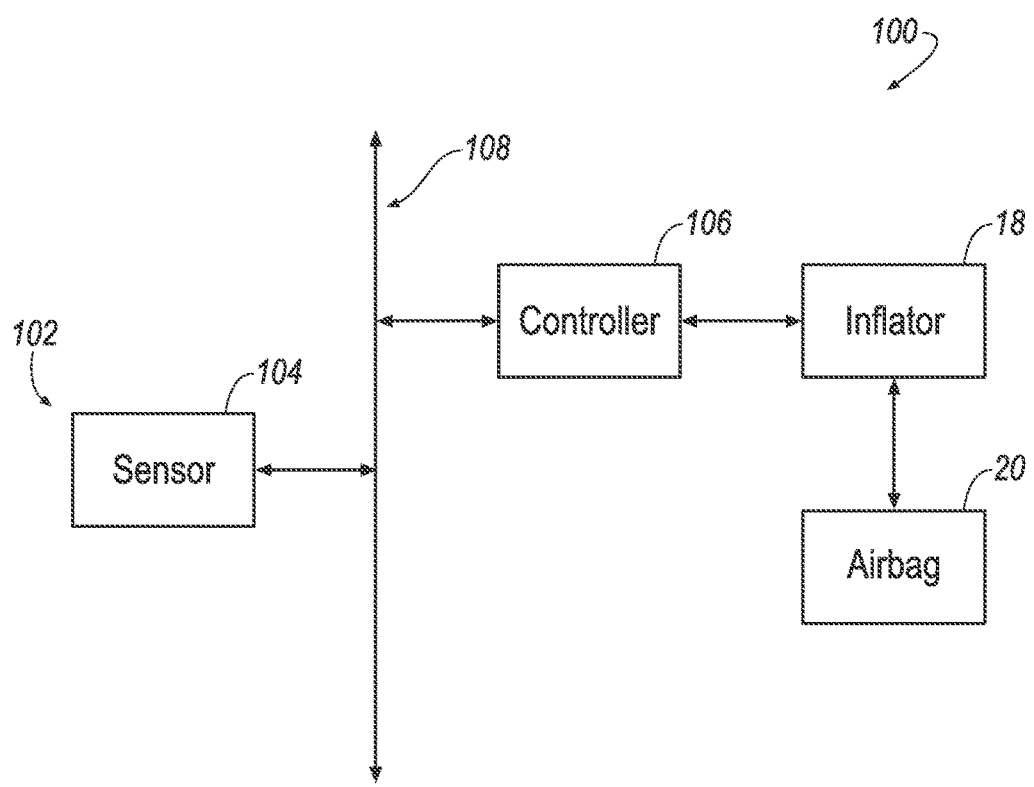
FIG. 6 is a schematic of an occupant restraint system including the airbag.

A schematic of the occupant restraint system 100 is shown in FIG. 6. The occupant restraint system 100 can include an impact sensing system 102. The impact sensing system 102 may include at least one sensor 104. The sensor 104 is adapted to detect an impact to the vehicle 10. The sensor 104 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The sensor 104 may be located at numerous points in or on the vehicle 10 for sensing, e.g., an impact of the vehicle 10. The sensor 104 is the only component of the impact sensing system 102 shown in FIG. 6. It should be appreciated, however, that the impact sensing system 102 may include additional components not shown in FIG. 6.

The occupant restraint system 100 may include a controller 106. The controller 106 and the sensor 104 may be connected to a communication bus 108, such as a controller area network (CAN) bus, of the vehicle 10. The controller 106 may use information from the communication bus 108 to control the activation of the inflator 18. The inflator 18 may be connected to the controller 106, as shown in FIG. 6, or may be connected directly to the communication bus 108.

The controller 106 may be in communication with the sensor 104 and the inflator 18, directly or through the communication bus 108, for activating the inflator 18, e.g., for providing an impulse to a pyrotechnic charge of the inflator 18, when the sensor 104 senses an impact of the vehicle 10. Alternatively or additionally to sensing impact, the impact sensing system 102 may be configured to sense impact prior to impact, i.e., pre-impact sensing. The sensor 104 may be of any suitable type, e.g., using radar, lidar, and/or a vision system. The vision system may include one or more cameras, CCD image sensor, and/or CMOS image sensor, etc.

The controller 106 may be a microprocessor-based controller. The sensor 104 is in communication with the controller 106 to communicate data to the controller 106. Based on the data communicated by the sensor 104, the controller 106 may instruct the inflator 18 to activate.

In operation, the airbag 20 is in the uninflated position, as shown in FIG. 1, under normal operating conditions of the vehicle 10. When the sensor 104 senses an impact of the vehicle 10, the impact sensing system 102 triggers communication to the controller 106 identifying the impact. In response, the controller 106 may instruct the inflator 18 to inflate the airbag 20 with the inflation medium, deploying the airbag 20 from the uninflated position to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
  a manifold chamber that is inflatable and has a top and a bottom;
  a middle chamber including a front panel and first and second side panels spaced from each other and extending from the front panel toward the manifold chamber;
  the front panel, the first side panel, and the second side panel extending from the top to the bottom of the manifold chamber; and
  a first side chamber directly attached to the first side panel and a second side chamber directly attached to the second side panel;
  the first side chamber and the second side chamber extending from the top to the bottom of the manifold chamber; and
  the manifold chamber being spaced from the front panel and attached to and in fluid communication with the middle chamber and the first and second side chambers.

2. The airbag of claim 1, wherein the first and second side chambers extend further from the manifold chamber than the front panel when in an inflated position.

3. The airbag of claim 1, wherein the middle chamber is configured to have a lower inflated stiffness than an inflated stiffness of the first side chamber and an inflated stiffness of the second side chamber.

4. The airbag of claim 1, wherein the middle chamber includes a vent from an interior of the middle chamber and an exterior of the airbag.

5. The airbag of claim 1, further comprising a tether connected to the front panel to form a depression in the front panel when in an inflated position.

6. The airbag of claim 1, wherein the first side chamber has an inner panel extending along the first side panel from the front panel to the manifold chamber, and wherein the second side chamber has an inner panel extending along the second side panel from the front panel to the manifold chamber.

7. The airbag of claim 1, wherein the manifold chamber includes an open end, and the middle chamber, the first side chamber, and the second side chamber each have an open end attached to the manifold chamber and in fluid communication with the open end of the manifold chamber.

8. The airbag of claim 7, wherein the first side panel and the second side panel extend from the front panel to the open end of the middle chamber.

9. The airbag of claim 8, wherein the first side chamber has an inner panel extending along the first side panel from the front panel to the open end of the first side chamber, and wherein the second side chamber has an inner panel extending along the second side panel from the front panel to the open end of the second side chamber.

10. The airbag of claim 7, wherein the middle chamber, the first side chamber, and the second side chamber cover the open end of the manifold chamber.

11. An airbag module comprising:
a base;
an inflator in fluid communication with an airbag; and
the airbag including a manifold chamber this is inflatable and has a top and a bottom;
the airbag including a middle chamber including a front panel and first and second side panels spaced from each other and extending from the front panel toward the manifold chamber;
the front panel, the first side panel, and the second side panel of the middle chamber extending from the top to the bottom of the manifold chamber;
the airbag including a first side chamber directly attached to the first side panel and a second side chamber directly attached to the second side panel, the first side chamber and the second side chamber extending from the top to the bottom of the manifold chamber;
the manifold chamber being spaced from the front panel and attached to and in fluid communication with the middle chamber and the first and second side chambers.

12. The airbag module of claim 11, wherein the first and second side chambers extend further from the manifold chamber than the front panel when in an inflated position.

13. The airbag module of claim 11, wherein the middle chamber is configured to have a lower inflated stiffness than an inflated stiffness of the first side chamber and an inflated stiffness of the second side chamber.

14. The airbag module of claim 11, wherein the middle chamber includes a vent from an interior of the middle chamber and an exterior of the airbag.

15. The airbag module of claim 11, further comprising a tether connected to the front panel to form a depression in the front panel when in an inflated position.

16. The airbag module of claim 11, wherein the first side chamber has an inner panel extending along the first side panel from the front panel to the manifold chamber, and wherein the second side chamber has an inner panel extending along the second side panel from the front panel to the manifold chamber.

17. The airbag module of claim 11, wherein the manifold chamber includes an open end, and the middle chamber, the first side chamber, and the second side chamber each have an open end attached to the manifold chamber and in fluid communication with the open end.

18. The airbag module of claim 17, wherein the first side panel and the second side panel extend from the front panel to the open end of the middle chamber.

19. The airbag module of claim 18, wherein the first side chamber has an inner panel extending along the first side panel from the front panel to the open end of the first chamber, and wherein the second side chamber has an inner panel extending along the second side panel from the front panel to the open end of the second side chamber.

20. The airbag module of claim 17, wherein the middle chamber, the first side chamber, and the second side chamber cover the open end of the manifold chamber.

* * * * *